| United States Patent [19] | [11] Patent Number: 4,806,592 |
| Saruyama | [45] Date of Patent: Feb. 21, 1989 |

[54] STORAGE-STABLE LIQUID SILICONE RUBBER COMPOSITION CONTAINING A PLATINUM-ALKENYSILOXANE COMPLEX CATALYST

[75] Inventor: Toshio Saruyama, Chiba, Japan

[73] Assignee: Toray Silicone Co., Ltd., Tokyo, Japan

[21] Appl. No.: 91,463

[22] Filed: Aug. 31, 1987

Related U.S. Application Data

[63] Continuation-in-part of Ser. No. 56,821, Jun. 2, 1987.

[30] Foreign Application Priority Data

Sep. 16, 1986 [JP] Japan ............................... 61-221189

[51] Int. Cl.$^4$ ............................................. C08L 83/04
[52] U.S. Cl. .................................... 524/860; 523/216; 524/861; 524/862; 524/588; 524/847; 528/15; 528/31; 528/32
[58] Field of Search ............................ 528/15, 31, 32; 523/216; 524/588, 847, 860, 861, 862

[56] References Cited

U.S. PATENT DOCUMENTS

| 4,500,584 | 2/1985 | Modic | 528/15 |
| 4,585,848 | 4/1986 | Evans et al. | 528/31 |
| 4,608,395 | 8/1986 | Hamada et al. | 528/15 |

Primary Examiner—Melvyn I. Marquis
Attorney, Agent, or Firm—Robert Spector

[57] ABSTRACT

The liquid silicone rubber compositions of this invention comprise an organopolysiloxane having silicon-bonded alkenyl radicals, a reinforcing silica filler and, as the curing catalyst, a platinum-alkenylsiloxane complex wherein the $pK_a$ value of the catalyst when measured under a specifed set of conditions is from 2.0 to 9.0, inclusive. The compositions have an excellent storage stability as one part of a two-package liquid silicone rubber composition that cures by a platinum catalyzed hydrosilation reaction.

11 Claims, No Drawings

STORAGE-STABLE LIQUID SILICONE RUBBER COMPOSITION CONTAINING A PLATINUM-ALKENYSILOXANE COMPLEX CATALYST

REFERENCE TO COPENDING APPLICATIONS

This application is a continuation-in-part of copending application Ser. No.056.821. filed on June 2, 1987.

BACKGROUND OF THE INVENTION

1. Field of the Invention

The present invention relates to silicone rubber compositions. More particularly. this invention relates to the use of certain platinum-alkenylsiloxane catalysts in storage stable liquid silicone rubber compositions containing a reinforcing silica filler and an organopolysiloxane having at least two alkenyl radicals per molecule. The compositions are combined with an organohydrogensiloxane to yield curable liquid silicone rubber compositions.

2. Description of the Prior Art

Silicone rubber moldings have been produced by the thermal curing of compositions consisting of an organopolysiloxane gum, a reinforcing silica filler and an organoperoxide. However, this method requires complex processing before molding, such as mastication and portion-wise discharge. To avoid these complications, a method has been developed for producing silicone rubber moldings using liquid silicone rubber composition that are cured by heating.

A preferred type of liquid silicone rubber composition comprises an organopolysiloxane having silicon-bonded vinyl radicals and a relatively low degree of polymerization, an organohydrogenpolysiloxane and a reinforcing silica filler. These compositions typically include a curing catalyst in the form of a platinum-alkenylsiloxane complex to accelerate the addition reaction between the silicon-bonded vinyl radicals and silicon-bonded hydrogen atoms. This method offers numerous advantages, including ease of handling and the capability of being processed by injection molding with its excellent productivity. This method's range of application has as a consequence undergone steady expansion.

Liquid silicone rubber compositions typically cannot be stored as a one-package composition for extended periods of time because the addition reaction responsible for curing of the composition occurs even at room temperature. These type of compositions are usually made available in two packages. One of the packages comprises the mixture of the organopolysiloxane having silicon-bonded vinyl radicals, the reinforcing silica and platinum-alkenylsiloxane complex. The second of the two packages contains a crosslinker composition comprising a mixture of the organopolysiloxane having silicon-bonded hydrogen atoms and reinforcing silica. Immediately prior to molding, the contents of the two containers are mixed to homogeneity to yield a curable liquid silicone rubber composition which is then shaped and thermally cured to provide the molding. Packaging the liquid silicone rubber composition in two containers does not provide long-term storage stability for the composition comprising the organopolysiloxane having silicon-bonded vinyl radicals, the reinforcing silica and the platinum-alkenylsiloxane complex. This mixture may undergo viscosity changes during long-term storage. The curing behavior during molding of the silicone rubber may also be changed. In the extreme case, the platinum-alkenylsiloxane complex suffers a decline in its catalytic activity, and it is not possible to obtain excellent properties in the cured silicone rubber.

The present inventor carried out a vigorous investigation with a view to eliminating the above problems, and the present invention was developed as a result.

One objective of the present invention is to provide a storage-stable platinum-alkenylsiloxane catalyst composition. A second objective is to provide liquid silicone rubber compositions that contain these storage-stable catalysts and cure by a platinum-catalyzed hydrosilation reaction.

SUMMARY OF THE INVENTION

The compositions of this invention comprise an organopolysiloxane having silicon-bonded alkenyl radicals, a reinforcing silica filler and, as the curing catalyst, a platinum-alkenylsiloxane complex wherein the $pK_a$ value of the catalyst when measured under a specified set of conditions is from 2.0 to 9.0, inclusive. The compositions have an excellent storage stability as one part of a two-package liquid silicone rubber composition that cures by a platinum catalyzed hydrosilation reaction.

DETAILED DESCRIPTION OF THE INVENTION

The objectives of the present invention are achieved by providing an improved liquid silicone rubber composition comprising (A) an organopolysiloxane containing at least 2 silicon-bonded alkenyl radicals in each molecule and having a viscosity of from 100 to 300,000 centipoise (0.1–300 Pa.s) at 25° C., (B) a microparticulate hydrophilic silica, and (C) an amount of a platinum-alkenylsiloxane complex sufficient to promote curing of said composition in the presence of an organohydrogensiloxane, where the improvement resides in the $pK_a$ value exhibited by a dispersion in a nonpolar solvent of 100 parts by weight of said silica and from 10 to 100 weight parts of said complex as atomic platinum, said $pK_a$ value being within the range of from 2.0 to 9.0, inclusive.

The inventive feature of the present compositions resides in the $pK_a$ value of the platinum-alkenylsiloxane complex, identified hereinabove as component (C). This complex is a catalyst for curing the composition of the present invention in the presence of an organohydrogensiloxane. The present catalysts can be classified as hydrosilylation reaction catalysts consisting essentially of a complex of platinum in which an alkenylsiloxane is coordinated with platinum. Such platinum- alkenylsiloxane complexes are described, for example, in Japanese Patent Publication No. 42-22924 [22,924/67], however, the present catalysts are not limited to the ones described in this publication.

The improved platinum-alkenylsiloxane complex catalyst compositions, referred to herein as component (C), are claimed in copending U.S. patent application Ser. No.056,821, filed on June 2, 1987, filed in the name of the present inventor.

The catalysts of the present compositions include reaction products of haloplatinic acid or a haloplatinate salt with an alkenylsiloxane, and are capable of promoting a hydrosilylation reaction. In accordance with the present invention, the $pK_a$ value of a dispersion in a nonpolar solvent of 100 weight parts component (B) and from 10 to 100 weight parts component (C), calculated as atomic platinum, must be within the range of from 2.0 to 9.0, inclusive. This range has been found to be critical in that the activity of a platinum-alkenylsiloxane complex as a hydrosilation catalyst will decline substantially when the $pK_a$ value falls below 2.0 or exceeds 9.0.

The structure of the alkenylsiloxane starting material for component (C) is not specifically restricted. In order to improve the stability of the resulting platinum-siloxane complex, the alkenylsiloxane contains at least 2 alkenyl radicals in each molecule. The alkenyl radicals are preferably bonded to two adjacent silicon atoms that are separated by an oxygen atom. Most preferably the alkenylsiloxane is a symmetrical tetraalkyldialkenyldisiloxane such as sym-tetramethyldivinyldisiloxane.

The concentration of component (C) in the present liquid silicone rubber compositions is preferably from 0.00001 to 1 parts by weight, calculated as atomic platinum, per 100 weight parts component (A). This is because the catalytic activity of the catalyst is not apparent at concentrations below 0.00001 part by weight, while exceeding 1 weight part is expensive and uneconomical.

Measurement of the $pK_a$ value in a nonpolar solvent is a necessary condition in the present invention. The acid strength of silica is usually measured in an aqueous dispersion or water/alcohol mixed solvent system. However, the ability of a catalyst to meet the present conditions cannot be determined by these measurement methods. The present inventor has found that $pK_a$ values measured in water or water/alcohol mixed systems do not correlate with the stability of the platinum-alkenylsiloxane complexes in the liquid silicone rubber compositions of this invention.

As used in the present specification, nonpolarity denotes the absence of dissociable, active hydrogen atoms. Aromatic hydrocarbons such as benzene and toluene or saturated hydrocarbons such as cyclohexane and normal-heptane are suitable solvents which satisfy the above conditions. Benzene and cyclohexane are optimal for conducting clear and accurate measurements.

The $pK_a$ value is not measured on the actual blended silicone rubber composition of this invention, but rather on the dispersion in a nonpolar solvent of finely divided hydrophilic silica and platinum-alkenylsiloxane complex. The relative concentration range of platinum-alkenylsiloxane complex, component (C), and the finely divided hydrophilic silica component (B), differ from the concentration ranges of these ingredients in the present liquid silicone rubber compositions. The dispersions used to determine the $pK_a$ value of the catalyst complex contain 100 parts by weight of silica and from 10 to 100 parts by weight of the catalyst complex, component (C), calculated as atomic platinum.

If the quantity of component (C) in the composition used to measure $pK_a$ values is less than 10 weight parts as atomic platinum, the hydrosilylation catalytic activity of the platinum- alkenylsiloxane complex in the liquid silicone rubber composition will decline even within the $pK_a$ range of from 2.0 to 9.0, and accordingly the objective of the present invention will not be achieved.

The acid strength of the platinum-alkenylsiloxane complex is concretely expressed by the $pK_a$ value. This is an index which covers not only the acid range, but also the alkaline range at $pK_a$ values greater than 7.0. The acid strength can be determined from the color of indicators. That is, 2-amino-5-azotoluene can be used as an indicator with a transition $pK_a$ value of 2.0, while Thymol blue can be used as an indicator with a transition $pK_a$ value of 9.0. The acid strength is determined by the addition of several drops of these indicator solutions diluted to from 0.05 to 0.1%. It is possible to conduct more exact measurements through the use of a narrow-transition mixed indicator or through the combined use of the visible absorption spectrum, but the above method is entirely satisfactory for accomplishing the object of the present invention.

The organopolysiloxane, referred to hereinbefore as component (A), is the principle ingredient of the present liquid silicone rubber base, and must contain at least 2 silicon-bonded alkenyl radicals in each molecule. Useful alkenyl radicals include but are not limited to vinyl, allyl, and propenyl. Other than alkenyl radicals and oxygen atoms, the substituents bonded to silicon in component (A) include monovalent organic groups which lack aliphatically unsaturated bonds. These monovalent organic groups include but are not limited to alkyl radicals such as methyl, ethyl, propyl and butyl; substituted alkyl radicals such as 2-phenylmethyl 2-phenylethyl, and 3,3,3-trifluoropropyl; and aryl radicals such as phenyl and tolyl, hydroxyl groups and alkoxy groups. The viscosity of the organopolysiloxane at 25° C. is within the range of from 100 to 300,000 centipoise (0.1–300 Pa.s) and preferably within the range of from 300 to 100,000 centipoise (0.3–100 Pa.s). This organopolysiloxane can be a single material or a mixture of two or more species. In the case of the use of such a mixture, polymers having viscosities below 100 centipoise or exceeding 300,000 centipoise can be used as long as the viscosity of the mixture falls within the range of from 100 to 300,000 centipoise.

The organopolysiloxane is preferably a diorganovinylsiloxy-terminated diorganopolysiloxane. Most preferably the silicon bonded radicals other than vinyl and oxygen are methyl, phenyl, 3,3,3-trifluoropropyl or combinations thereof.

The microparticulate silica used as component (B) in the present compositions is a finely divided reinforcing agent for liquid silicone rubbers. As is well known, such finely divided hydrophilic silicas can be generally divided into two categories according to the method of production.

One category of suitable silicas includes those produced by the reaction of tetrachlorosilane in the oxyhydrogen flame, and known as fumed silicas or dry-method silicas. In the second category fall wet method silicas produced by the reaction of water glass with acid and removal of the water and salt.

Both dry-method and wet-method silicas can be used in the present invention, but wet-method silicas are preferred because this results in greater stability for the compositions.

The concentration of component (B) is preferably from 1 to 100 parts by weight per 100 parts by weight of component (A). Easily usable forms, i.e., a suspension paste or plastic, will not be obtained at below 1 part by weight. When the silica content exceeds 100 parts by weight a homogeneous mixture with component (A) cannot be obtained.

In addition to the organopolysiloxane comprising component (A), the finely divided hydrophilic silica comprising component (B), and the platinum-alkenylsiloxane complex comprising component (C), the present liquid silicone rubber compositions typically include a fourth component as described below for the purpose of adjusting the $pK_a$ value of the catalyst complex.

In general one finds that the $pK_a$ value of a dispersion described hereinbefore containing components (B) and (C) and a nonpolar solvent value is typically less than 2.0. As a consequence, component (B), the finely divided reinforcing silica, must be treated with a basic material such as an alkali metal, an alkaline earth metal and certain compounds of alkali and alkaline earth metals to adjust the $pK_a$ value. Examples of suitable treating agents include but are not limited to alkali metal silanolates such as potassium silanolate and sodium silanolate, and alkali metal alcoholates such as potassium butoxide and sodium ethoxide.

Crepe-hardening inhibitors, polymers other than organopolysiloxanes, organic solvents, crosslinking-reaction inhibitors, heat stabilizers such as iron oxide and rare earth compounds, flame retardants such as manganese carbonate and fumed titanium, and quartz powder, diatomaceous earth calcium carbonate, glass fiber, and carbon black can be added to the present compositions as necessary, unless the presence of these materials adversely affects the objectives of this invention.

The sequence of addition of the ingredients of the present silicone rubber compositions and the temperature, pressure, and shear conditions used to mix these ingredients are not specifically restricted.

The liquid silicone rubber compositions of the present invention are readily prepared by blending the organopolysiloxane together with the other ingredients in a planetary mixer, kneader mixer, or other mixing device, with heating at a temperature of from 100 to 300 C. preferably from 150° to 250° C. for 10 minutes to 3 hours. The finely divided silica, preferably a wet-method silica, is added either in one portion or a number of smaller portions, and the resultant mixture is then heated for from 30 minutes to 5 hours with mixing to produce a liquid silicone rubber base. This base is then cooled to room temperature and the platinum-alkenylsiloxane complex comprising component (C) is then added with mixing.

Compared with prior compositions, the compositions of the present invention provide a remarkable improvement in storage stability. Even during long-term storage the compositions will not undergo an increase in viscosity or a decline in catalytic activity by the platinum-alkenylsiloxane complex, as a consequence the present compositions can be advantageously utilized as part of a curable liquid silicone rubber composition.

The following examples describe preferred embodiments of the present liquid silicone rubber compositions, and should not be interpreted as limiting the scope of the invention defined in the accompanying claims. Unless other wise specified all parts and percentages in the examples are by weight, and viscosities were measured at 25° C.

The $pK_a$ values of the catalyst complexes in a nonpolar solvent were measured as follows.

Into a plurality of test tubes were placed 0.1 g of one of the treated or untreated finely divided hydrophilic silicas described hereinafter and 5 ml of benzene. To each of the test tubes was then added 0.5 g of the platinum-vinylsiloxane complex prepared as described below in Reference Example 2. Mixing of the samples to homogeneity was followed by the addition of an indicator solution for measuring the $pK_a$ and addition of sufficient benzene to achieve a concentration of platinum-vinylsiloxane complex of from 0.05 to 0.1%. The $pK_a$ value was determined by noting the color of the indicator.

The amount of platinum-vinylsiloxane complex added to each sample was held constant at 0.5 g because it had been found that the $pK_a$ value of all the finely divided silicas became constant upon the addition of 0.3 g platinum-vinylsiloxane complex. It was observed that settling of the silica occurred during measurement of the $pK_a$ value, and in some cases the color of the solution differed from the color of the sediment. In these cases, the color of the precipitated silica was used for the color observation.

REFERENCE EXAMPLE 1

Adjusting the $pK_a$ Value of Finely Divided Hydrophilic Silicas 30.0 g of a wet-method silica (Nipsil LP from Nippon Silica Kogyo Kabushiki Kaisha) were dispersed in 500 g water, 200 ml. 0.1N aqueous sodium hydroxide was added, and this was mixed for 1 hour. This mixture was filtered, followed by drying at 150° C. for 6 hours. The resultant solid was pulverized and passed through a 200 mesh filter to yield a finely divided silica referred to hereinafter as silica A.

Silica B was prepared using the same procedure described for silica A, with the exception that 400 ml. of a 0.1 N aqueous sodium hydroxide solution was used.

30.0 g dry-method silica (Aerosil 200 from Nippon Aerosil Kabushiki Kaisha) was dispersed in 800 g water, 150 ml. of a 0.1N aqueous sodium hydroxide solution was added, and this was mixed for 1 hour. This mixture was then filtered, followed by drying for 6 hours at 150° C. The resultant solid was pulverized and passed through a 200 mesh filter to yield a finely divided silica referred to hereinafter as silica C.

1.0 g calcium stearate was added to 30.0 g of wet-method silica (Nipsil LP from Nippon Silica Kogyo Kabushiki Kaisha). The resultant mixture was blended at room temperature over 1 day and then heated at 180° C. for 2 hours to yield silica D.

1.0 g calcium stearate was added to 30.0 g of a dry-method silica (Aerosil 200 from Nippon Aerosil Kabushiki Kaisha). The resultant mixture was blended to homogeneity at room temperature over 1 day and then heated at 180° C. for 2 hours to yield silica E.

Table 1 reports the $pK_a$ values for dispersions in 5 ml benzene of 0.1 g of each of the foregoing five types of treated finely divided hydrophilic silicas in combination with 0.5 g of a platinum-vinylsiloxane complex prepared as described in Reference Example 2. For comparison purposes Table 1 also reports the $pK_a$ values for untreated Nipsil LP and untreated Aerosil 200 measured under the same conditions.

TABLE 1

| silica type | $pK_a$ |
|---|---|
| silica A | 4.0–4.8 |
| silica B | 4.8–6.8 |
| silica C | 4.8–6.8 |
| silica D | 4.0–4.8 |
| silica E | 4.8–6.8 |
| Comparative Examples | |
| Nipsil LP (untreated) | 0.8–1.5 |
| Aerosil 200 (untreated) | 0.8–1.5 |

REFERENCE EXAMPLE 2

Synthesis of the Platinum-Vinylsiloxane Complex 160 g 1,3-divinyltetramethyldisiloxane was mixed with 32.0 g chloroplatinic acid ($H_2PtCl_6 \cdot 6H_2O$), and this was heated and mixed for 1 hour at 120° C. under a nitrogen flow. The platinum black by-product was removed by filtration and the acid was removed by washing with water to yield a reaction product containing the platinum-vinylsiloxane complex. The platinum concentration in this reaction product was 4.25 wt. %.

EXAMPLE 1

100 Parts dimethylvinylsiloxane-terminated dimethylpolysiloxane having a viscosity of 2,000 centipoise (2 Pa.s) were placed in a planetary mixer and heated with stirring until the internal temperature reached 550° C. 30 Parts of wet-method silica A produced as described in Reference Example 1 were then added in 4 portions over a period of about 1 hour. Following completion of the silica addition the resultant composition was mixed for 2 hours with heating and under vacuum, followed by cooling. To the resultant composition was added 8.4 mg of the platinum-alkenylsiloxane complex reaction product obtained in Reference Example 2 with stirring to yield a liquid silicone rubber composition of this invention (I). One part of the obtained composition was placed in a plastic container, which was then tightly sealed and heated at 50° C. for 1 month.

Curable silicone rubber compositions were prepared by mixing (1) 1.4 parts methylsiloxane-methylhydrogensiloxane copolymer containing 1% of silicon-bonded hydrogen atoms, (2) 0.003 parts 3-methylbutyn-1-ol as a catalyst inhibitor with either (3) 100 parts of the above composition (I) immediately after mixing or (4) 100 parts of the above composition (I) after aging at 50° C. for 1 month. The viscosity and curing characteristics of the curable compositions and the physical properties of the cured silicone rubber were measured, and these results are reported in Table 2.

The cure time for the liquid silicone rubber composition and the physical properties of the cured silicone rubber were measured as follows.

Cure time: The curable liquid silicone rubber composition was placed in a curastometer (Curastometer Model 3 from Toyo-Baldwin Kabushiki Kaisha) and then heated to 130 degrees C. The interval of time from the start of heating to the start of curing of the liquid silicone rubber, i.e. the time at which the composition first began to exhibit the behavior of an elastic material, was measured, and this was designated as the cure time.

Physical properties of the cured silicone rubber: the curable liquid silicone rubber composition was placed in a metal mold and then press-vulcanized at 150° C. for 5 minutes to produce a 2 mm-thick silicone rubber sheet. The physical properties of this sheet were measured in accordance with JIS K 6301.

Also reported in Table 2 are the results of measurements obtained using curable silicone rubber compositions of this invention that were prepared as described in the preceding portion of this example, but using silica B or silica D (produced as described in Reference Example 1) in place of silica A.

For comparative purposes Table 2 also reports the results of measurements on a curable liquid silicone rubber composition produced as described in the preceeding sections of this example, but using in place of silica A the untreated wet-method silica referred to in Reference Example 1.

TABLE 2

| | The Present Invention | | | Comparison Example |
|---|---|---|---|---|
| | A | B | C | D |
| Composition | | | | |
| Dimethylpolysiloxane (parts) | 100 | 100 | 100 | 100 |
| Silica A (parts) | 30 | — | — | — |
| Silica B (parts) | — | 30 | — | — |
| Silica D (parts) | — | — | 30 | — |
| Nipsil LP (parts) | — | — | — | 30 |
| Properties of the Composition Immediately After Mixing | | | | |
| initial viscosity (poise) | 2,700 | 2,630 | 2,910 | 2,800 |
| curing characteristic: curing start time (sec.) | 20 | 20 | 19 | 20 |
| hardness | 39 | 40 | 41 | 40 |
| tensile strength (kg/cm$^2$) | 55 | 53 | 53 | 53 |
| elongation (%) | 260 | 250 | 260 | 230 |
| tear strength (kg/cm$^2$) | 8 | 8 | 8 | 8 |
| Properties of the composition after aging at 50° C. for 30 days | | | | |
| initial viscosity (poise) | 2,810 | 2,720 | 3,010 | 3,500 |
| curing characteristic: curing start time (sec.) | 22 | 21 | 19 | 320 |
| hardness | 40 | 39 | 41 | 8 |
| tensile strength (kg/cm$^2$) | 55 | 54 | 52 | 10 |
| elongation (%) | 250 | 250 | 270 | 300 |

EXAMPLE 2

Curable liquid silicone rubber compositions were prepared as described in Example 1, with the exceptions that the dry-method silicas C and E described in Reference Example 1 were used in place of silica A. The various properties of these compositions were measured by the same methods as in Example 1, and the results are reported in Table 3.

For purposes of comparison. Table 3 also reports the measurement results for a curable liquid silicone rubber composition outside the scope of the present invention. The composition was produced as described in Example 1. but using in place of silica A the untreated dry-method silica described in Reference Example 1.

TABLE 3

| | The Present Invention | | Comparison Example |
|---|---|---|---|
| Composition | E | F | G |
| dimethylpolysiloxane (parts) | 100 | 100 | 100 |
| silica (parts) | silica C 30 | silica E 30 | Aerosil 200 30 |
| Properties for the composition immediately after mixing | | | |
| initial viscosity (poise) | 4,520 | 5,200 | 4,800 |
| curing characteristic: curing start time (sec.) | 18 | 20 | 18 |
| hardness | 41 | 43 | 42 |
| tensile strength (kg/cm$^2$) | 69 | 74 | 72 |
| elongation (%) | 300 | 330 | 320 |
| tear strength (kg/cm$^2$) | 9 | 9 | 9 |
| Properties for the composition after aging at 50° C. for 30 days | | | |
| initial viscosity (poise) | 4,600 | 5,230 | 6,100 |
| curing characteristic: curing start time (sec.) | 19 | 20 | 64 |
| hardness | 40 | 41 | 27 |
| tensile strength (kg/cm$^2$) | 65 | 70 | 43 |

TABLE 3-continued

| Composition | The Present Invention | | Comparison Example |
| --- | --- | --- | --- |
| | E | F | G |
| elongation (%) | 290 | 340 | 230 |

The data in the preceding examples demonstrate the unexpected increase in long-term storage stability of liquid silicone rubber compositions when the $pK_a$ value of the platinum-alkenylsiloxane complex catalyst, measured as described hereinabove, is within the range of from 2.0 to 9.0

That which is claimed is:

1. In an improved liquid silicone rubber composition comprising the product obtained by blending to homogeniety (A) an organopolysiloxane containing at least 2 silicon-bonded alkenyl radicals in each molecule and having a viscosity of from 100 to 300,000 centipoise (0.1–300 Pa.s) at 25° C.

(B) a microparticulate hydrophilic silica, and (C) an amount of a platinum-alkenylsiloxane complex sufficient to promote curing of said composition in the presence of an organohydrogensiloxane, the improvement characterized by the $pK_a$ value exhibited by a dispersion in a nonpolar solvent of 100 parts by weight of said silica and from 10 to 100 weight parts of said complex as atomic platinum, where said value is within the range of from 2.0 to 9.0, inclusive.

2. A composition according to claim 1 where said silica is produced by the reaction of water glass with acid.

3. A composition according to claim 1 where said alkenylsiloxane is a divinyltetramethyldisiloxane.

4. A composition according to claim 3 where said alkenylsiloxane is a symmetrical divinyltetraalkyldisiloxane.

5. A composition according to claim 4 where said alkenylsiloxane is sym-tetramethyldivinyldisiloxane.

6. A composition according to claim 1 where said nonpolar solvent is an aromatic hydrocarbon.

7. A composition according to claim 6 where said aromatic hydrocarbon is benzene.

8. A composition according to claim 1 where the $pK_a$ value of the silica is adjusted by treating it with a basic material selected from the group consisting of an alkali metal, an alkaline earth metal, an alkali metal hydroxide, an alkali metal silanolate, an alkali metal alcoholate, an alkaline earth metal hydroxide, an alkaline earth metal silanolate, and a calcium salt of a higher aliphatic carboxylic acid.

9. A composition according to claim 8 where the silica treating agent is sodium hydroxide or calcium stearate.

10. A composition according to claim 1 where said organopolysiloxane is a diorganovinylsiloxy-terminated diorganopolysiloxane exhibiting a viscosity of from 300 to 100,000 centipoise.

11. A composition according to claim 10 where said diorganovinylsiloxy-terminated diorganopolysiloxane is a dimethylvinylsiloxy-terminated dimethylpolysiloxane.

* * * * *